United States Patent
Ichiki (10) Patent No.: US 11,539,868 B2
(45) Date of Patent: Dec. 27, 2022

(54) IMAGING SYSTEM AND VEHICLE WINDOW USED FOR THE SAME

(71) Applicant: Sony Semiconductor Solutions Corporation, Kanagawa (JP)

(72) Inventor: Hiroshi Ichiki, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 16/981,663

(22) PCT Filed: Dec. 18, 2018

(86) PCT No.: PCT/JP2018/046506
§ 371 (c)(1),
(2) Date: Sep. 16, 2020

(87) PCT Pub. No.: WO2019/181112
PCT Pub. Date: Sep. 26, 2019

(65) Prior Publication Data
US 2021/0099622 A1 Apr. 1, 2021

(30) Foreign Application Priority Data
Mar. 23, 2018 (JP) .............................. JP2018-056118

(51) Int. Cl.
*B60J 1/02* (2006.01)
*H04N 5/225* (2006.01)
(Continued)

(52) U.S. Cl.
CPC ........... *H04N 5/2254* (2013.01); *B60R 11/04* (2013.01); *H04N 5/2253* (2013.01);
(Continued)

(58) Field of Classification Search
CPC ............ H04N 5/2254; H04N 5/22521; H04N 5/2253; H04N 5/247; H04N 5/235;
(Continued)

(56) References Cited

U.S. PATENT DOCUMENTS

2006/0034002 A1* 2/2006 Troxell ................... B60R 1/00
359/737
2007/0216768 A1* 9/2007 Smith ..................... B60J 1/02
348/118
(Continued)

FOREIGN PATENT DOCUMENTS

JP 2003-219226 A 7/2003
JP 2010-042703 A 2/2010
(Continued)

OTHER PUBLICATIONS

International Search Report and English translation thereof dated Mar. 5, 2019 in connection with International Application No. PCT/JP2018/046506.
(Continued)

*Primary Examiner* — Patrick E Demosky
(74) *Attorney, Agent, or Firm* — Wolf, Greenfield & Sacks, P.C.

(57) ABSTRACT

A camera lens attaching portion 30 is fitted into an opening provided in a vehicle window 20. A lens of a camera 40 is attached to a lens attaching surface 31a of the camera lens attaching portion 30. A surface opposed to the lens attaching surface 31a is a window surface 31b. The window surface 31b is an inclined surface different from a window surface 22 of the vehicle window 20. Furthermore, the window surface 31b may be an inclined surface same as the window surface 22 of the vehicle window 20. The camera 40 images outside of the vehicle through the camera lens attaching portion 30 with an angle of view set within the window surface 31b of the camera lens attaching portion 30. It is
(Continued)

possible to prevent reflection of a reflected image generated on a vehicle inner side of the vehicle window.

8 Claims, 10 Drawing Sheets

(51) Int. Cl.
*B60R 11/04* (2006.01)
*H04N 5/247* (2006.01)
*B60R 1/00* (2022.01)
*B60R 11/00* (2006.01)

(52) U.S. Cl.
CPC .......... *H04N 5/22521* (2018.08); *H04N 5/247* (2013.01); *B60R 1/00* (2013.01); *B60R 2011/004* (2013.01); *B60R 2011/0026* (2013.01); *B60R 2300/10* (2013.01); *B60R 2300/20* (2013.01)

(58) Field of Classification Search
CPC .......... H04N 7/183; H04N 7/18; B60R 11/04; B60R 1/00; B60R 2011/0026; B60R 2011/004; B60R 2300/10; B60R 2300/20; H05K 999/99; B60J 1/02
See application file for complete search history.

(56) References Cited

U.S. PATENT DOCUMENTS

| | | | |
|---|---|---|---|
| 2010/0001897 A1* | 1/2010 | Lyman | G01S 7/032 |
| | | | 342/70 |
| 2011/0163904 A1* | 7/2011 | Alland | B60R 1/00 |
| | | | 342/1 |
| 2013/0050489 A1* | 2/2013 | Taylor | B60R 11/04 |
| | | | 348/148 |
| 2018/0338074 A1 | 11/2018 | Furutake | |
| 2019/0315202 A1* | 10/2019 | Oya | B60J 1/002 |
| 2020/0047689 A1* | 2/2020 | Kaplan | B32B 17/10293 |
| 2020/0391577 A1* | 12/2020 | Bard | B32B 17/10348 |

FOREIGN PATENT DOCUMENTS

| | | |
|---|---|---|
| JP | 2014-216730 A | 11/2014 |
| JP | 2016-203952 A | 12/2016 |
| JP | 2018-196012 A | 12/2018 |
| WO | 2018/025481 A1 | 2/2018 |
| WO | WO-2019147605 A1 * | 8/2019 ....... B32B 17/10036 |

OTHER PUBLICATIONS

Written Opinion and English translation thereof dated Mar. 5, 2019 in connection with International Application No. PCT/JP2018/046506.

International Preliminary Report on Patentability and English translation thereof dated Oct. 8, 2020 in connection with International Application No. PCT/JP2018/046506.

* cited by examiner

IMAGING SYSTEM AND VEHICLE WINDOW USED FOR THE SAME

CROSS-REFERENCE TO RELATED APPLICATIONS

This application claims the benefit under 35 U.S.C. § 371 as a U.S. National Stage Entry of International Application No. PCT/JP2018/046506, filed in the Japanese Patent Office as a Receiving Office on Dec. 18, 2018, which claims priority to Japanese Patent Application Number JP2018-056118, filed in the Japanese Patent Office on Mar. 23, 2018, each of which is hereby incorporated by reference in its entirety.

TECHNICAL FIELD

The present technology relates to an imaging system and a vehicle window used for the same.

BACKGROUND ART

Conventionally, a camera has been provided in a vehicle and has imaged the front side of the vehicle through a windshield. Furthermore, there is a case where a reflected image of an object in the vehicle, for example, a dashboard, an illumination in the vehicle, or the like is reflected on an inner surface of the windshield. Therefore, in the invention of the Patent Document 1, a lens hood and a camera are moved in a front-back direction as necessary so as to prevent the reflection of the reflected image of the object in the vehicle or the like in a captured image. Furthermore, in the invention of the Patent Document 2, a lens hood used to prevent the reflection of the object in the vehicle on the windshield is provided.

CITATION LIST

Patent Document

Patent Document 1: Japanese Patent Application Laid-Open No. 2010-042703
Patent Document 2: Japanese Patent Application Laid-Open No. 2016-203952

SUMMARY OF THE INVENTION

Problems to be Solved by the Invention

By the way, the configuration in which the lens hood and the camera are moved in the front-back direction needs a position adjusting mechanism. Furthermore, in a case where the reflection is prevented by providing the lens hood, the windshield is inclined. Therefore, the size of the lens hood increases.

Therefore, an object of the present technology is to provide an imaging system that can prevent reflection of a reflected image generated on a vehicle inner side of a vehicle window and a vehicle window used for the same.

Solutions to Problems

A first aspect of the present technology is
an imaging system including:
a camera lens attaching portion that is provided on a vehicle window and has a lens attaching surface on a vehicle interior side; and
a camera, of which a lens is attached to the camera lens attaching portion, that images outside of a vehicle through the camera lens attaching portion, in which
the camera is attached so that an optical axis direction of the lens is orthogonal to the lens attaching surface.

According to the present technology, for example, by forming an opening in the vehicle window and fitting the camera lens attaching portion having the lens attaching surface on the vehicle interior side into the opening, the camera lens attaching portion is attached to the vehicle window. A surface of the camera lens attaching portion opposed to the lens attaching surface is a window surface, and is an inclined surface same as or different from a window surface of the vehicle window. For example, a cross-sectional surface of the camera lens attaching portion has a polygonal shape, and the window surface opposed to the lens attaching surface is an inclined surface that is the same as the window surface of the vehicle window. Furthermore, a wiper using the window surface of the vehicle window and the window surface of the camera lens attaching portion as wiping surfaces is included. Furthermore, the cross-sectional surface of the camera lens attaching portion has a shape of an alphabet L, a corner portion of the shape of the alphabet L is provided to be projected in a mountain-like shape toward outside of the vehicle from the vehicle window. One projecting surface is used as the window surface, and a surface opposed to the window surface is the lens attaching surface. Furthermore, a wiper using the window surface of the camera lens attaching portion as a wiping surface is further included. A light shielding portion may be provided on a surface of the camera lens attaching portion other than a camera lens attaching surface and the window surface.

The camera is attached so that the optical axis direction of the lens is orthogonal to the lens attaching surface, and the camera images outside of the vehicle through the camera lens attaching portion as setting an angle of view within the window surface of the camera lens attaching portion. Furthermore, the camera lens attaching portion may be provided for each camera, or a plurality of cameras may be provided on the camera lens attaching portion.

A second aspect of the present technology is
a vehicle window having a lens attaching surface to which a lens front surface side of a camera that images outside of a vehicle is attached, in which a camera lens attaching portion that is formed so that an optical axis direction of the camera is orthogonal to the lens attaching surface is provided.

Effects of the Invention

According to the present technology, the camera lens attaching portion having the lens attaching surface on the vehicle interior side is provided on the vehicle window. The camera is attached to the camera lens attaching portion so that the optical axis direction of the lens is orthogonal to the lens attaching surface, and the camera images outside of the vehicle through the camera lens attaching portion. Therefore, it is possible to prevent the reflection of the reflected image generated on the vehicle inner side of the vehicle window. Note that the effects described herein are only exemplary and not limited to these. Furthermore, there may be an additional effect.

MODE FOR CARRYING OUT THE INVENTION

Hereinafter, modes for carrying out the present technology will be described. Note that the description will be made in the following order.

1. Configuration of Imaging System
2. Application Example of Imaging System

<1. Configuration of Imaging System>

An imaging system includes a camera lens attaching portion provided on a vehicle window and a camera, of which a lens is attached to the camera lens attaching portion, that images outside of a vehicle through the camera lens attaching portion. Furthermore, for example, the camera lens attaching portion is separately formed from the vehicle window and is fitted into an opening provided in the vehicle window so that the camera lens attaching portion is provided in the vehicle window. Furthermore, the camera lens attaching portion may be integrally formed with the vehicle window. Hereinafter, a case where the camera lens attaching portion and the vehicle window are separately formed will be described.

Figure 1:
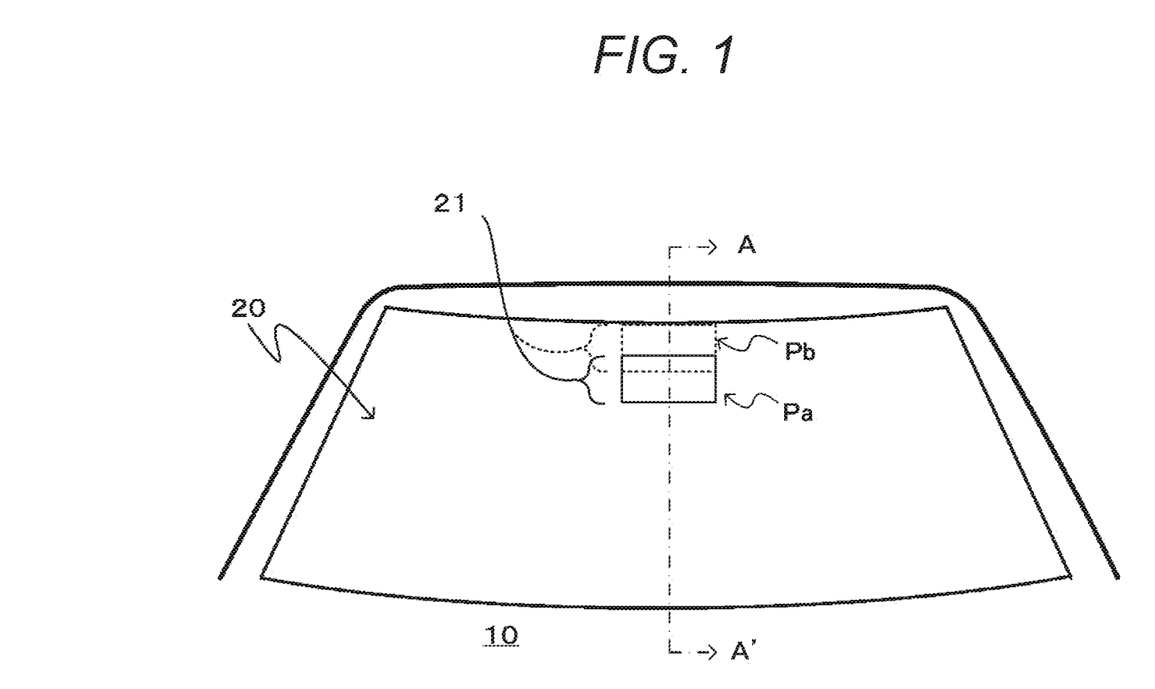
FIG. 1 is a diagram illustrating a configuration of an imaging system.

FIG. 1 illustrates a configuration of the imaging system. A vehicle window 20 used in an imaging system 10 is formed by using a resin, and an opening 21 into which the camera lens attaching portion is fitted is provided, for example, at a position Pa on an upper side at the center as indicated by a solid line or a position Pb at an upper end of the center as indicated by a broken line. A camera lens attaching portion to be described later is fitted into the opening 21. The resin forming the vehicle window 20 includes, for example, polycarbonate or the like. A shape of the vehicle window 20 including resin can be relatively freely designed than that includes glass. Therefore, in the vehicle window 20 including resin, the opening 21 can be relatively easily formed.

One surface of the camera lens attaching portion is a lens attaching surface on which a lens of a camera is attached. Furthermore, a surface opposed to the lens attaching surface when the camera lens attaching portion is fitted into the opening 21 is a window surface. The window surface of the camera lens attaching portion may be an inclined surface different from or the same as a window surface of the vehicle window. Furthermore, in the camera lens attaching portion, for example, a light shielding portion is provided on a surface other than the lens attaching surface and the window surface. The camera is attached to the camera lens attaching portion so that an optical axis direction of the lens is orthogonal to the lens attaching surface.

FIGS. 2 to 5 illustrate embodiments of the imaging system. Note that, in FIGS. 2 to 5, the cross-sectional view of the vehicle window 20 and a camera lens attaching portion 30 taken along a line A-A' in FIG. 1 is illustrated together with a camera 40.

Figure 2:
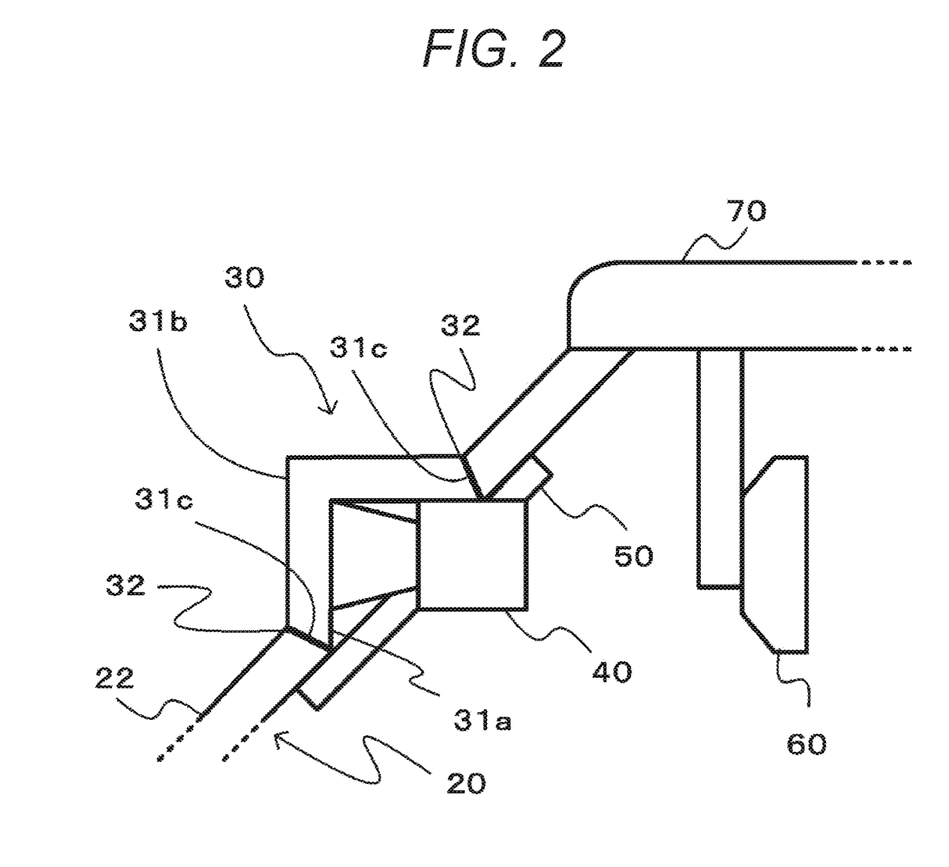
FIG. 2 is a diagram illustrating a first embodiment of the imaging system.

FIG. 2 illustrates a first embodiment of an imaging system, and the window surface of the camera lens attaching portion is an inclined surface different from the window surface of the vehicle window.

In the first embodiment, a cross-sectional surface of the camera lens attaching portion 30 is formed in a shape of an alphabet L. The shape of the alphabet L in the first embodiment and a second embodiment to be described later has a corner portion having an angle that is not limited to approximately 90°. The angle of the corner portion of the L shape includes an acute angle than 90° or an obtuse angle than 90°. Furthermore, the opening 21 of the vehicle window 20 is provided at the position Pa on the upper side at the center illustrated in FIG. 1. Note that an upper end of the vehicle window 20 is fixed to a roof portion 70.

The corner portion of the shape of the alphabet L of the camera lens attaching portion 30 is fitted into the opening 21 so as to project in a mountain-like shape toward the outside of the vehicle from a window surface 22 of the vehicle window 20. Furthermore, one projecting surface of the camera lens attaching portion 30 is a window surface 31*b* facing a front direction with respect to a vehicle traveling direction, and a surface opposed to the window surface 31*b* is a lens attaching surface 31*a*. The lens attaching surface 31*a* and the window surface 31*b* are formed to be orthogonal to an optical axis direction of a lens of the camera 40. The lens of the camera 40 and the lens attaching surface 31*a* are formed in contact with each other and without having a space therebetween. Moreover, an end of the camera lens attaching portion 30 is a joint surface 31*c*. In the camera lens attaching portion 30, on a surface other than the lens attaching surface 31*a* and the window surface 31*b*, for example, on the joint surface 31*c*, a light shielding portion 32 is provided. Note that a fixing mechanism portion 50 is fixed to the vehicle window 20, and the camera 40 is detachably fixed to the fixing mechanism portion 50. The camera 40 has a configuration detachable from the fixing mechanism portion 50 so that, for example, in a case where a failure occurs in the camera 40, it is possible to easily maintain the camera 40.

The camera lens attaching portion 30 may include resin same as the vehicle window 20. In this case, since an entire windshield of the vehicle includes the same material, the windshield can be formed without spoiling beauty of appearance. However, as long as the material transmits light, the camera lens attaching portion 30 may include the material different from the vehicle window 20.

The camera 40 images outside of the vehicle through the camera lens attaching portion 30 with an angle of view set within the window surface 31*b* of the camera lens attaching portion 30. Furthermore, the camera 40 is attached so that the optical axis direction of the lens of the camera 40 has a predetermined angle with respect to the window surface 22 of the vehicle window 20.

According to such a first embodiment, the lens of the camera 40 is attached to the camera lens attaching portion 30, and the camera 40 images the outside of the vehicle through the camera lens attaching portion 30 with the angle of view set within the window surface 31*b* of the camera lens attaching portion 30. Therefore, the camera 40 can obtain a captured image in which reflection of a reflected image generated on the vehicle inner side of the vehicle window 20 is prevented. Furthermore, by providing the light shielding portion on the surface other than the lens attaching surface 31a and the window surface 31b of the camera lens attaching portion 30, it is possible to perform an imaging operation that is less likely to be affected by an object in the vehicle or the like. Furthermore, by providing the light shielding portion 32 on a fitting surface of the vehicle window 20 and the camera lens attaching portion 30, it is possible to prevent an influence of light diffusely reflected in the vehicle window. Note that the camera 40 is provided behind a rearview mirror 60 and does not interfere with the driver's field of view.

Figure 3:
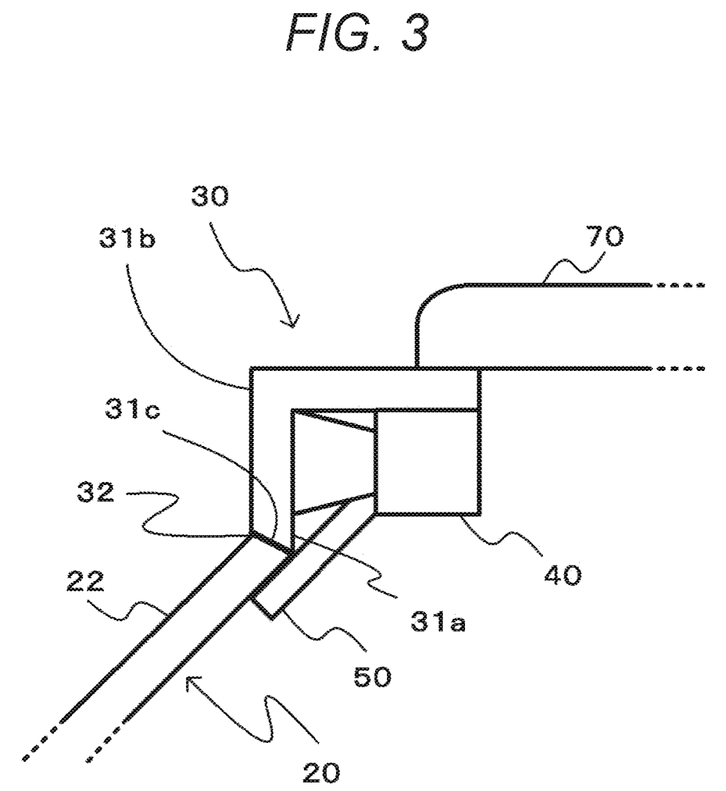
FIG. 3 is a diagram illustrating a second embodiment of the imaging system.

FIG. 3 illustrates a second embodiment of an imaging system, and the window surface of the camera lens attaching portion is an inclined surface different from the window surface of the vehicle window.

In the second embodiment, a cross-sectional surface of a camera lens attaching portion 30 is formed in a shape of an alphabet L. Furthermore, an opening 21 of a vehicle window 20 is provided at a position Pb on an upper end at the center illustrated in FIG. 1.

The corner portion of the shape of the alphabet L of the camera lens attaching portion 30 is fitted into the opening 21 so as to project in a mountain-like shape toward the outside of the vehicle from a window surface 22 of the vehicle window 20. Furthermore, one projecting surface of the camera lens attaching portion 30 is a window surface 31b facing a front direction with respect to a vehicle traveling direction, and a surface opposed to the window surface 31b is a lens attaching surface 31a. The lens attaching surface 31a and the window surface 31b are formed to be orthogonal to an optical axis direction of a lens of the camera 40. The lens of the camera 40 and the lens attaching surface 31a are formed in contact with each other and without having a space therebetween. Moreover, an end of the camera lens attaching portion 30 is a joint surface 31c. In the camera lens attaching portion 30, on a surface other than the lens attaching surface 31a and the window surface 31b, for example, on the joint surface 31c, a light shielding portion 32 is provided. Note that a fixing mechanism portion 50 is fixed to the vehicle window 20 or a roof portion 70, and the camera 40 is detachably fixed to the fixing mechanism portion 50. The camera 40 has a configuration detachable from the fixing mechanism portion 50 so that, for example, in a case where a failure occurs in the camera 40, it is possible to easily maintain the camera 40.

The camera lens attaching portion 30 may include resin same as the vehicle window 20. In this case, since an entire windshield of the vehicle includes the same material, the windshield can be formed without spoiling beauty of appearance. However, as long as the material transmits light, the camera lens attaching portion 30 may include the material different from the vehicle window 20.

The camera 40 images outside of the vehicle through the camera lens attaching portion 30 with an angle of view set within the window surface 31b of the camera lens attaching portion 30. Furthermore, the camera 40 is attached so that the optical axis direction of the lens of the camera 40 has a predetermined angle with respect to the window surface 22 of the vehicle window 20.

According to such a second embodiment, as in the first embodiment, the camera 40 images the outside of the vehicle through the camera lens attaching portion 30. Therefore, a captured image can be obtained in which reflection of a reflected image generated on the vehicle inner side of the vehicle window 20 is prevented. Furthermore, by providing the light shielding portion on the surface other than the lens attaching surface 31a and the window surface 31b, it is possible to perform an imaging operation that is less likely to be affected by an object in the vehicle or the like. Furthermore, by providing the light shielding portion 32 on a fitting surface of the vehicle window 20 and the camera lens attaching portion 30, it is possible to prevent an influence of light diffusely reflected in the vehicle window.

Figure 4:
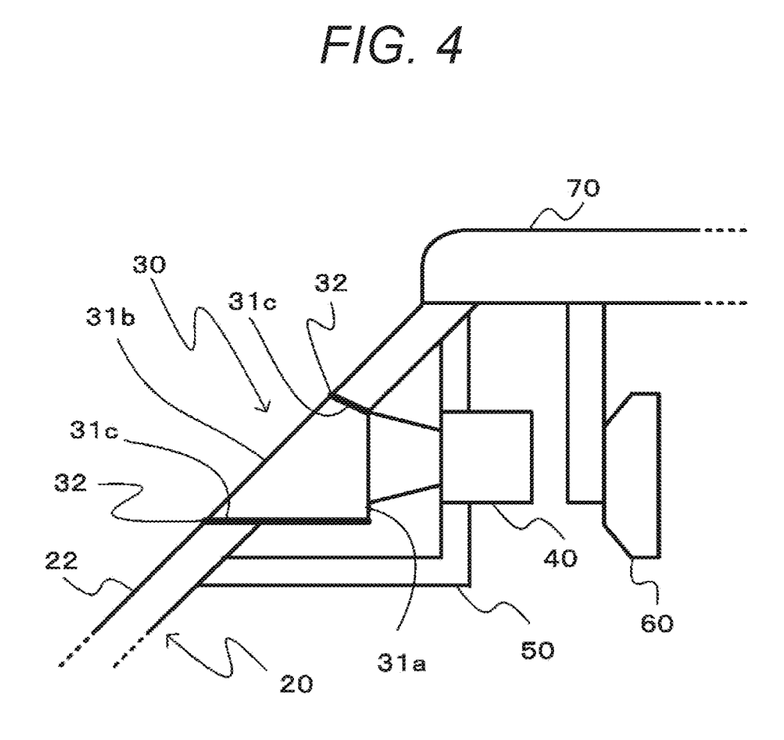
FIG. 4 is a diagram illustrating a third embodiment of the imaging system.

FIG. 4 illustrates a third embodiment of an imaging system, and the window surface of the camera lens attaching portion is an inclined surface same as the window surface of the vehicle window.

In the third embodiment, a cross-sectional surface of a camera lens attaching portion 30 is formed in a polygonal shape (for example, rectangle in FIG. 4). Furthermore, the opening 21 of the vehicle window 20 is provided at the position Pa on the upper side at the center illustrated in FIG. 1. Note that an upper end of the vehicle window 20 is fixed to a roof portion 70.

A corner portion of the rectangle of the camera lens attaching portion 30 is fitted into the opening 21 so as to project in a mountain-like shape toward the inner side of the vehicle from a window surface 22 of the vehicle window 20. Furthermore, one projecting surface of the camera lens attaching portion 30 faces backward with respect to a vehicle traveling direction and is a lens attaching surface 31a. The lens attaching surface 31a is formed to be orthogonal to an optical axis direction of a lens of a camera 40. The lens of the camera 40 and the lens attaching surface 31a are formed in contact with each other and without having a space therebetween. Furthermore, a surface opposed to the lens attaching surface 31a is a window surface 31b that is the same as the window surface 22 of the vehicle window 20. The window surface 31b has a predetermined angle with respect to the lens attaching surface 31a. Moreover, in the camera lens attaching portion 30, a surface other than the lens attaching surface 31a and the window surface 31b is a joint surface 31c, and a light shielding portion 32 is provided on the joint surface 31c. Note that a fixing mechanism portion 50 is fixed to the vehicle window 20, and the camera 40 is detachably fixed to the fixing mechanism portion 50. The camera 40 has a configuration detachable from the fixing mechanism portion 50 so that, for example, in a case where a failure occurs in the camera 40, it is possible to easily maintain the camera 40.

The camera lens attaching portion 30 may include resin same as the vehicle window 20. In this case, since an entire windshield of the vehicle includes the same material, the windshield can be formed without spoiling beauty of appearance. However, as long as the material transmits light, the camera lens attaching portion 30 may include the material different from the vehicle window 20.

The camera 40 images outside of the vehicle through the camera lens attaching portion 30 with an angle of view set within the window surface 31b of the camera lens attaching portion 30. Furthermore, the camera 40 is attached so that the optical axis direction of the lens of the camera 40 has a predetermined angle with respect to the window surface 22 of the vehicle window 20.

According to such a third embodiment, as in the first and second embodiments, the camera 40 images the outside of the vehicle through the camera lens attaching portion 30. Therefore, a captured image can be obtained in which reflection of a reflected image generated on the vehicle inner side of the vehicle window 20 is prevented. Furthermore, by providing the light shielding portion on the surface other than the lens attaching surface 31a and the window surface 31b, it is possible to perform an imaging operation that is less likely to be affected by an object in the vehicle or the like. Furthermore, by providing the light shielding portion 32 on a fitting surface of the vehicle window 20 and the camera lens attaching portion 30, it is possible to prevent an influence of light diffusely reflected in the vehicle window. Note that the camera 40 is provided behind a rearview mirror 60 as in the first embodiment and does not interfere with the driver's field of view.

Figure 5:
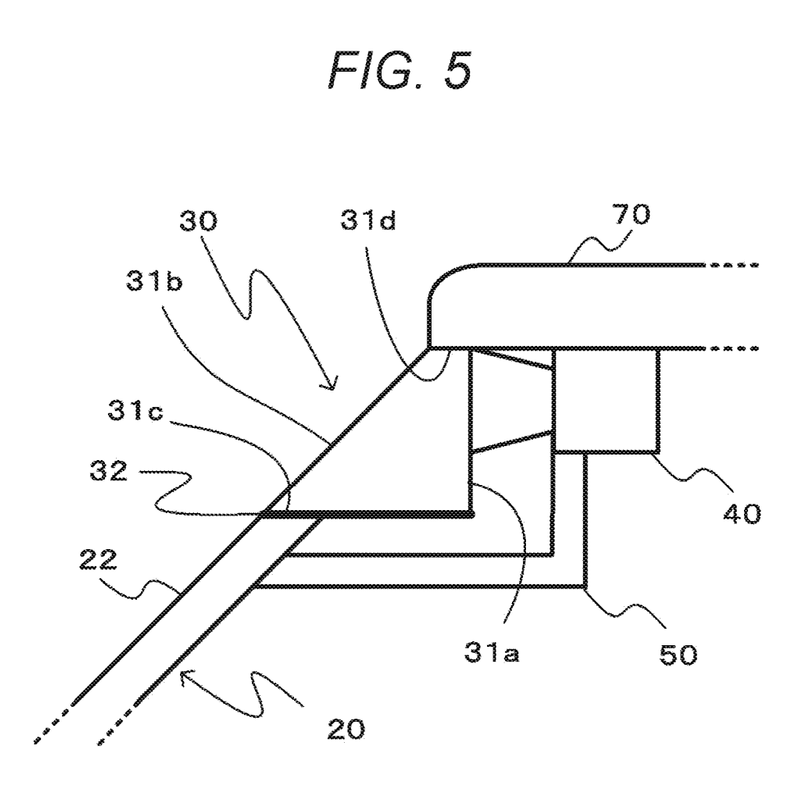
FIG. 5 is a diagram illustrating a fourth embodiment of the imaging system.

FIG. 5 illustrates a fourth embodiment of an imaging system, and the window surface of the camera lens attaching portion is an inclined surface same as the window surface of the vehicle window.

In the fourth embodiment, a cross-sectional surface of a camera lens attaching portion 30 is formed in a polygonal shape (for example, rectangle in FIG. 5). Furthermore, an opening 21 of a vehicle window 20 is provided at a position Pb on an upper end at the center illustrated in FIG. 1.

A corner portion of the rectangle of the camera lens attaching portion 30 is fitted into the opening 21 so as to project in a mountain-like shape toward the inner side of the vehicle from a window surface 22 of the vehicle window 20. Furthermore, one projecting surface of the camera lens attaching portion 30 faces backward with respect to a vehicle traveling direction and is a lens attaching surface 31a. The lens attaching surface 31a is formed to be orthogonal to an optical axis direction of a lens of a camera 40. The lens of the camera 40 and the lens attaching surface 31a are formed in contact with each other and without having a space therebetween. Furthermore, a surface opposed to the lens attaching surface 31a is a window surface 31b that is the same as the window surface 22 of the vehicle window 20. The window surface 31b has a predetermined angle with respect to the lens attaching surface 31a. Furthermore, an upper surface of the camera lens attaching portion 30 is fixed to a roof portion 70. Moreover, in the camera lens attaching portion 30, a surface other than the lens attaching surface 31a, the window surface 31b, and an upper surface 31d is a joint surface 31c, and a light shielding portion 32 is provided on the joint surface 31c. Note that a fixing mechanism portion 50 is fixed to the vehicle window 20 or a roof portion 70, and the camera 40 is detachably fixed to the fixing mechanism portion 50. The camera 40 has a configuration detachable from the fixing mechanism portion 50 so that, for example, in a case where a failure occurs in the camera 40, it is possible to easily maintain the camera 40.

The camera lens attaching portion 30 may include resin same as the vehicle window 20. In this case, since an entire windshield of the vehicle includes the same material, the windshield can be formed without spoiling beauty of appearance. However, as long as the material transmits light, the camera lens attaching portion 30 may include the material different from the vehicle window 20.

The camera 40 images outside of the vehicle through the camera lens attaching portion 30 with an angle of view set within the window surface 31b of the camera lens attaching portion 30. Furthermore, the camera 40 is attached so that the optical axis direction of the lens of the camera 40 has a predetermined angle with respect to the window surface 22 of the vehicle window 20.

According to such a fourth embodiment, as in the first to the third embodiments, the camera 40 images the outside of the vehicle through the camera lens attaching portion 30. Therefore, a captured image can be obtained in which reflection of a reflected image generated on the vehicle inner side of the vehicle window 20 is prevented. Furthermore, by providing the light shielding portion on the surface other than the lens attaching surface 31a and the window surface 31b, it is possible to perform an imaging operation that is less likely to be affected by an object in the vehicle or the like. Furthermore, by providing the light shielding portion 32 on a fitting surface of the vehicle window 20 and the camera lens attaching portion 30, it is possible to prevent an influence of light diffusely reflected in the vehicle window.

By the way, raindrops, impurities, or the like are attached on the vehicle window 20 and the window surface 31b of the camera lens attaching portion 30. Therefore, the opening 21 of the vehicle window 20 may be provided on a wiping surface of a wiper (hereinafter, referred to as "vehicle window wiper") that wipes raindrops or the like on the vehicle window 20. Specifically, with the configuration indicated in the third configuration described above, the camera lens attaching portion 30 is fitted into the opening 21 provided in the wiping surface of the vehicle window wiper. In this way, when raindrops or the like on the vehicle window 20 are wiped by using a configuration similar to a traditional configuration, it is possible to wipe raindrops or the like on the window surface 31b of the camera lens attaching portion 30.

Furthermore, in a case of the configuration in which the vehicle window wiper cannot wipe raindrops or the like attached on the window surface 31b of the camera lens attaching portion 30, a wiper that wipes raindrops or the like on the window surface 31b of the camera lens attaching portion 30 (hereinafter, referred to as "wiper for camera lens attaching portion") is provided. For example, in a case where the opening 21 is provided at the upper end and outside the range of the wiping surface of the vehicle window wiper as in the fourth embodiment described above or in a case where the window surface 31b of the camera lens attaching portion 30 is different from the inclined surface of the vehicle window 20 as in the first and second embodiments, the wiper for the camera lens attaching portion is separately provided from the vehicle window wiper.

Figure 6:
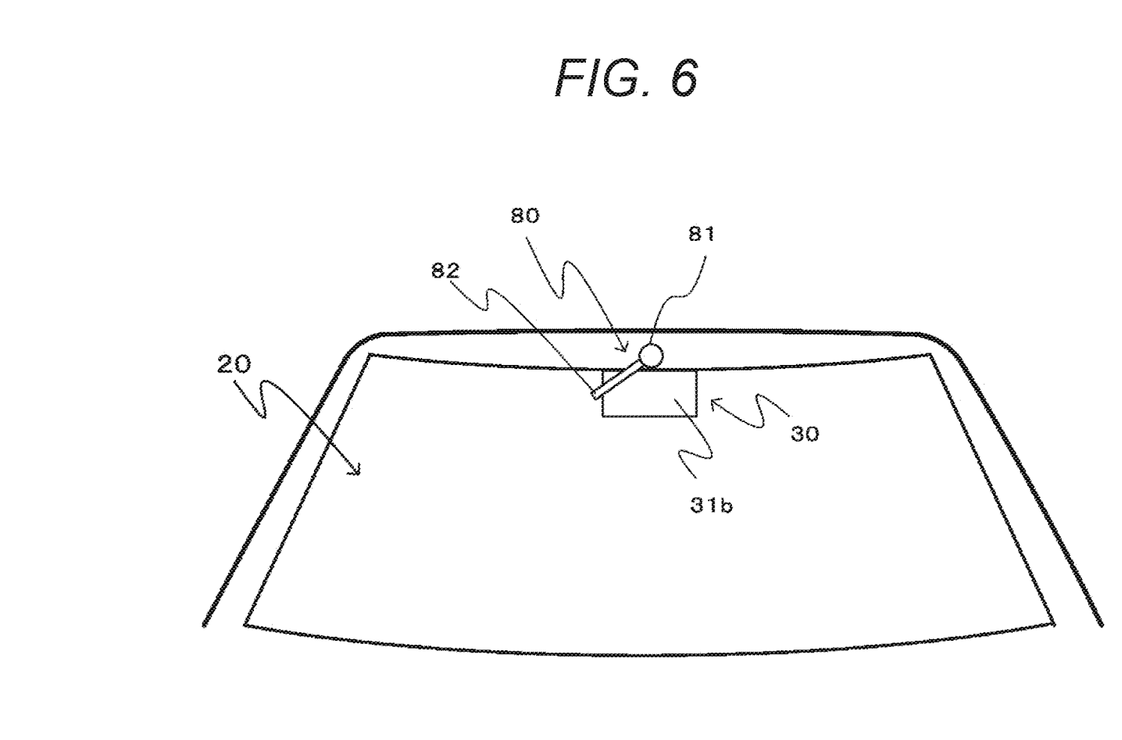
FIG. 6 is a diagram illustrating a case where a wiper for a camera lens attaching portion is provided.

FIG. 6 illustrates a case where a wiper for the camera lens attaching portion is provided. A wiper for the camera lens attaching portion 80 includes a wiper motor 81 and a wiper blade 82.

Figure 7:
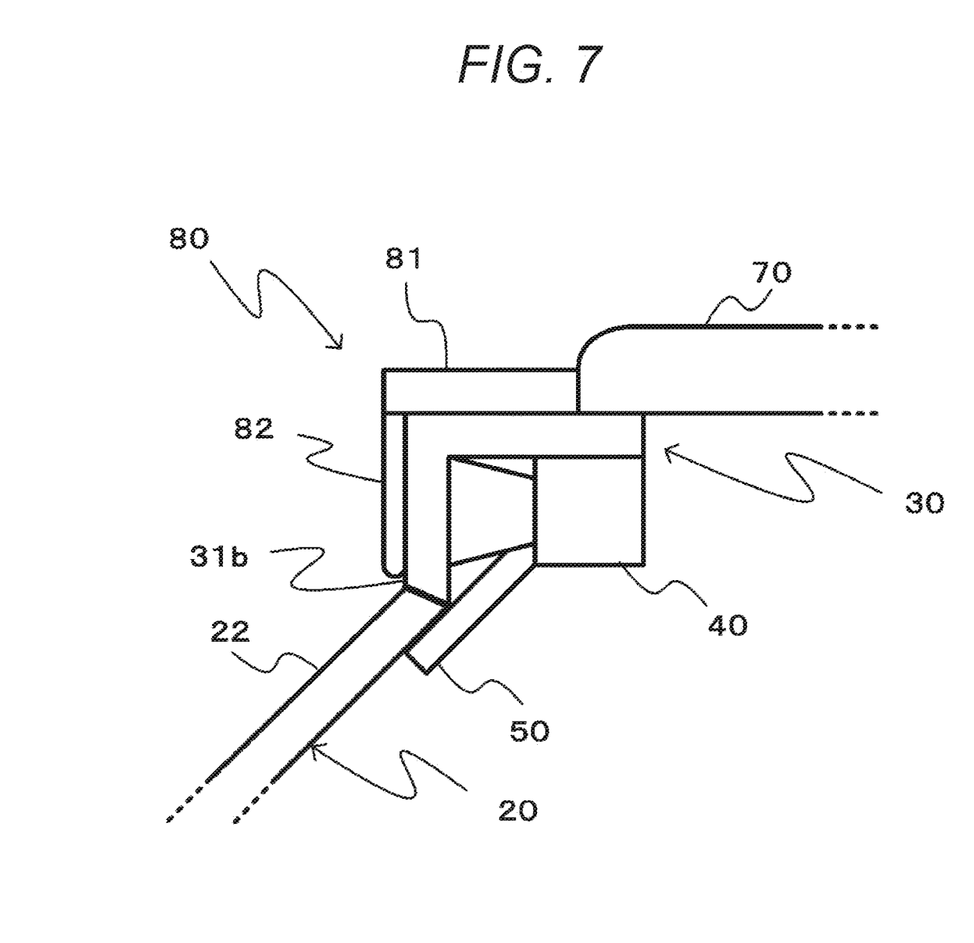
FIG. 7 is a diagram illustrating a case where the wiper for the camera lens attaching portion is provided (a case of second embodiment).
Figure 8:
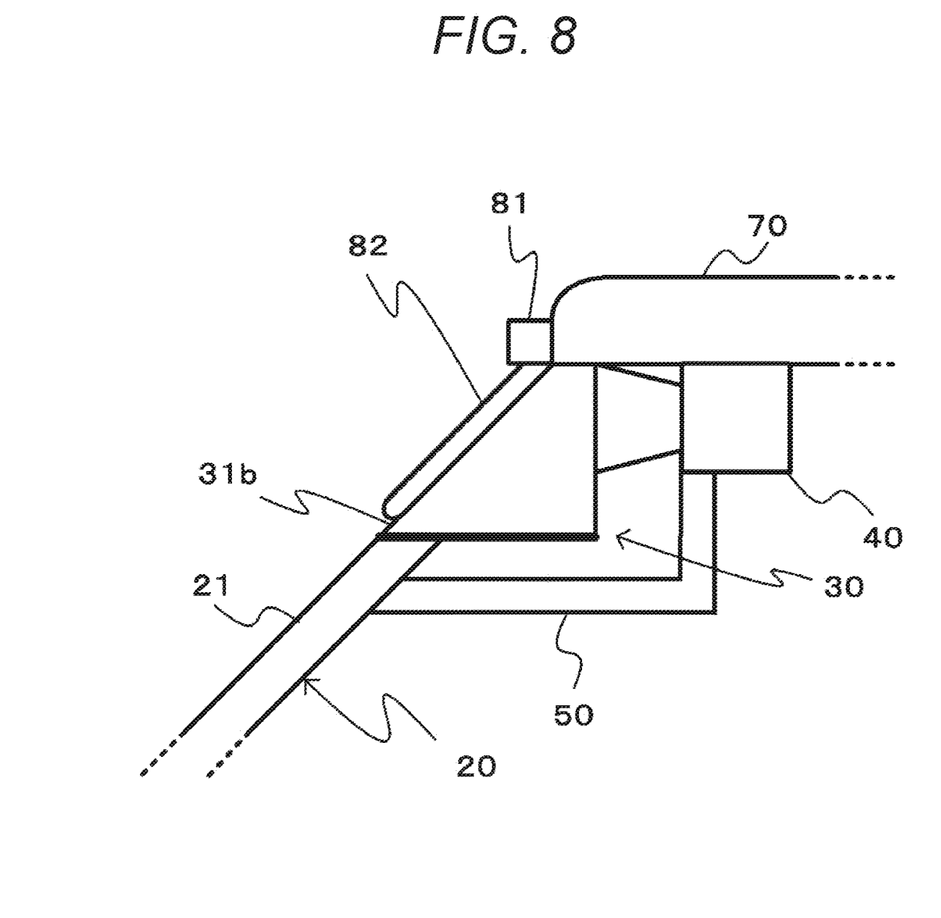
FIG. 8 is a diagram illustrating a case where the wiper for the camera lens attaching portion is provided (a case of fourth embodiment).
Figure 9:
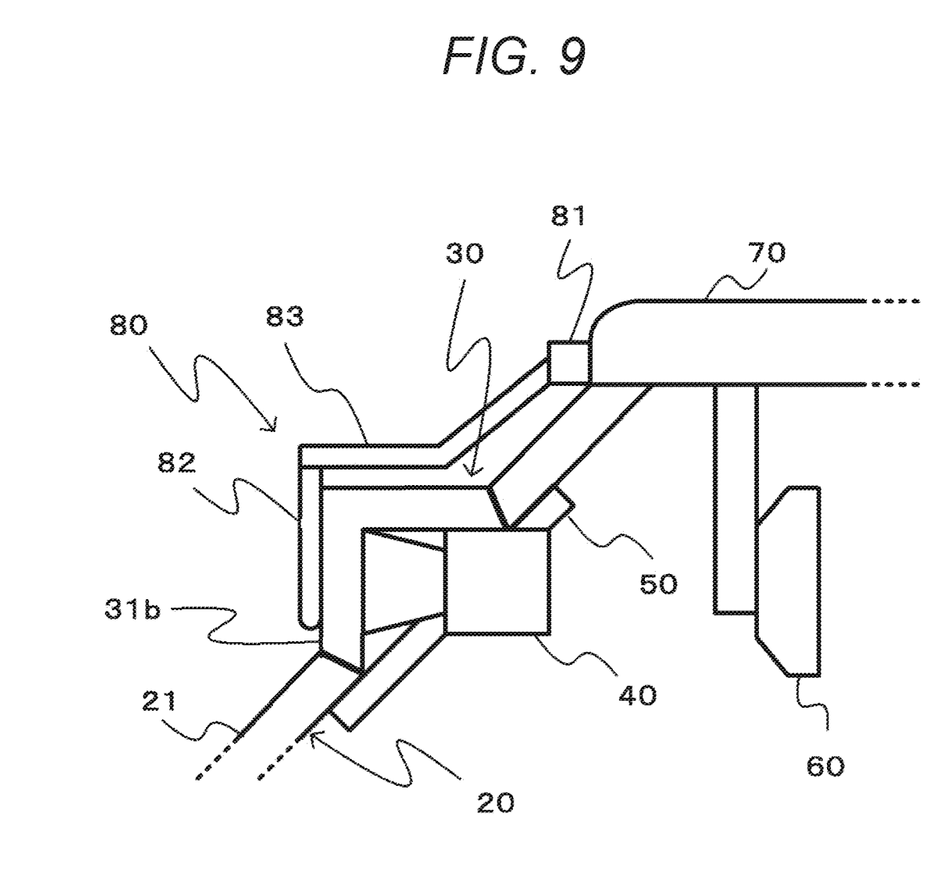
FIG. 9 is a diagram illustrating a case where the wiper for the camera lens attaching portion is provided (a case of first embodiment).

FIGS. 7 to 9 illustrate an embodiment of a wiper for a camera lens attaching portion. Note that, in FIG. 7, a cross-sectional diagram of the vehicle window 20 and the camera lens attaching portion 30 are illustrated together with the camera 40 and the wiper for the camera lens attaching portion 80.

FIG. 7 illustrates a case of the second embodiment, FIG. 8 illustrates a case of the fourth embodiment, and FIG. 9 illustrates a case of the first embodiment.

As illustrated in FIG. 7 or 8, the wiper motor 81 of the wiper for the camera lens attaching portion 80 is provided on the upper side of the opening 21, for example, on the roof portion 70. The wiper blade 82 has contact with the window surface 31b of the camera lens attaching portion 30 and is attached to the wiper motor 81. The wiper motor 81 causes the wiper blade 82 to reciprocate on the window surface 31b and wipes raindrops or the like attached on the window surface 31b. In this way, by providing the wiper for the camera lens attaching portion 80, the camera 40 can obtain a captured image with an excellent field of view.

Furthermore, as illustrated in FIG. 9, in a case where the imaging system has the configuration according to the first embodiment, the opening 21 of the vehicle window 20 is provided at a position away from the upper end. Furthermore, when the wiper motor 81 is provided on the roof portion 70, a distance between the wiper motor 81 and the window surface 31b of the camera lens attaching portion 30 is increased. Therefore, the wiper motor 81 and the wiper blade 82 are coupled to each other via a wiper arm 83, and the wiper blade 82 reciprocates on the window surface 31b of the camera lens attaching portion 30 when the wiper motor 81 is driven. With such a configuration, as in the second embodiment or the fourth embodiment, since it is possible to wipe raindrops or the like attached on the window surface 31b, the camera 40 can obtain the captured image with an excellent field of view.

Note that, in the above embodiments, a case where the camera 40 images the front side of the vehicle has been described. However, for example, a configuration may be used in which the camera lens attaching portion 30 is attached on a vehicle rear window and the camera 40 of which the lens is attached to the camera lens attaching portion 30 images the rear side of the vehicle. Furthermore, in the above embodiments, a case where imaging is performed by using the single camera has been described. However, in a case where a stereo image is acquired by using a plurality of cameras, the plurality of cameras may be attached to the camera lens attaching portion 30, or the opening 21 and the camera lens attaching portion 30 may be provided for each camera.

<2. Application Example of Imaging System>

The imaging system according to the present disclosure can be applied to various products. For example, the technology according to the present disclosure may be realized as an apparatus to be mounted on any type of a car, a motorcycle, an airplane, a drone, a ship, a robot, a construction machine, an agricultural machine (tractor), and the like.

Figure 10:
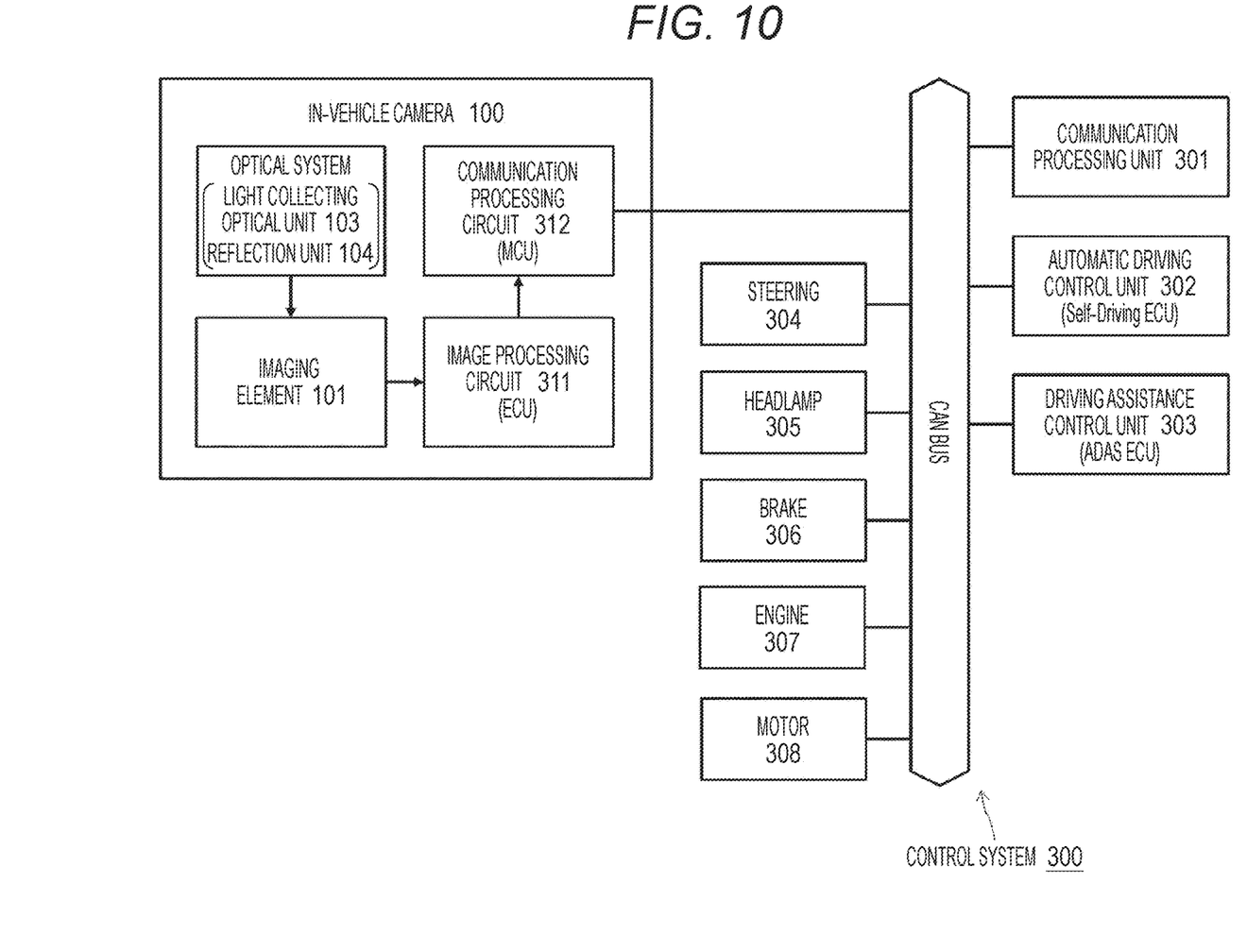
FIG. 10 is a diagram illustrating an example of a functional block diagram of a control system.

FIG. 10 illustrates an example of a functional block diagram of a control system 300 in a vehicle using the imaging system. The illustrated control system 300 includes an in-vehicle camera 100, and units are mutually connected via a CAN bus.

The in-vehicle camera 100 is disposed, for example, near a rearview mirror on an inner side of a windshield of the vehicle and images the front side in a vehicle traveling direction. An image captured by the in-vehicle camera 100 is used basically for sensing, it is assumed to detect a white line (lane) of a road, a traffic light, a traffic sign, an oncoming vehicle, pedestrians around the vehicle, or the like by applying image processing such as image recognition on the captured image. However, the image captured by the in-vehicle camera 100 may be used for viewing, and the image may be displayed in the vehicle interior.

The in-vehicle camera 100 includes an optical system including a light collecting optical unit 103 and a reflection unit 104, an imaging element 101, an image processing circuit 311, and a communication processing circuit 312.

The light collecting optical unit 103 collects light entering a windshield 110, and the reflection unit 104 reflects light output from the light collecting optical unit 103 toward an imaging surface of the imaging element 101 (as described above).

It is assumed that the reflection unit 104, the imaging element 101, the image processing circuit 311, and the communication processing circuit 312 be mounted on the same substrate 102 (not illustrated in FIG. 10). Although not illustrated in FIG. 10, it is assumed that a driving circuit of the imaging element 101 and a power supply circuit for the in-vehicle camera 100 be mounted on the same substrate.

The imaging element 101 outputs a captured image (RAW data) to the image processing circuit 311, for example, by serial communication. The imaging element 101 and the image processing circuit 311 are wired by a wiring pattern formed on the substrate 102 in the shortest distance, and it is possible to obtain stable EMC characteristics.

The image processing circuit 311 includes, for example, an Electronic Control Unit (ECU). In a case of the in-vehicle camera 100 for sensing, in the image processing circuit 311, image processing and recognition processing are executed on the image captured by the imaging element 101.

As the image processing executed in the image processing circuit 311, processing such as Automatic Exposure (AE) control, Auto White Balance (AWB) control, High Dynamic Range (HDR) synthesis, or the like can be exemplified. However, the imaging element 101 can execute these image processing.

Furthermore, as the recognition processing executed in the image processing circuit 311, detection of a white line (lane) of a road (Lane Detection), pedestrian detection (Pedestrian Detection), surrounding vehicle detection (Vehicle DEtection), detection of headlight of an oncoming vehicle (Headlight Detection), detection of brake light of a preceding vehicle (Automatic Emergency Breaking), traffic light recognition (Traffic Sign Recognition), or the like are executed.

The communication processing circuit 312 includes, for example, a Micro Control Unit (MCU). The communication processing circuit 312 is an interface for CAN communication in the control system 300 and converts a signal format in the CAN communication and a signal format in the in-vehicle camera 100. The detection and recognition results by the image processing circuit 311 are transmitted to the control system 300 of the vehicle via the communication processing circuit 312.

A communication processing unit (Communication Unit) 301 on the side of the control system 300 of the vehicle exchanges data in vehicle-to-vehicle communication, pedestrian-to-vehicle communication, road-to-vehicle communication, and communication with the in-vehicle camera 100. The communication processing unit 301 further communicates with a server (not illustrated). It is assumed that various types of wireless communication can be applied to the communication processing unit 301.

An automatic driving control unit (Self Driving ECU) 302 is an ECU including a Central Processing Unit (CPU), an Image Signal Processor (ISP), a Graphic Processing Unit (GPU), or the like and controls automatic driving of the vehicle. For example, the result obtained by performing the image recognition on the captured image captured by the in-vehicle camera 100 by the GPU is transmitted to a server via the communication processing unit 301, and the server performs deep learning such as deep neural net so that the learning result can be received.

A driving assistance control unit (Advanced Driving Assistance System (ADAS) ECU) 303 can exchange signals with each component of the vehicle through the CAN communication. The driving assistance control unit 303 generates a control signal used to control each component of the vehicle in response to a driving operation by a driver, a recognition result of the captured image captured by the in-vehicle camera 100, or the like and sends the control signal through the CAN communication.

A steering 304, a headlamp 305, a brake 306, an engine 307, and a motor 308 are components of the vehicle to be controlled by the automatic driving control unit 302 and the driving assistance control unit 303. However, it should be understood that components of the vehicle to be controlled other than those illustrated in FIG. 10 exist.

For example, when the driving assistance control unit 303 detects that the vehicle is likely to deviate from the white line by the image recognition of the captured image captured by the in-vehicle camera 100, the driving assistance control unit 303 transmits a control signal used to drive an Electronic Power Steering (EPS) motor to the steering 304. Furthermore, the driving assistance control unit 303 detects presence or absence of a headlight of an oncoming vehicle by the image recognition of the captured image captured by the in-vehicle camera 100 and switches the headlamp 305 between a high beam and a low beam. Alternatively, the driving assistance control unit 303 emits the high beam that avoids the oncoming vehicle.

As the recognition processing, the image processing circuit 311 in the in-vehicle camera 100 may output the recognized sensing information, that is, only the detection result by the image recognition without outputting image information. Several pieces of sensing information are indicated below.

Pedestrian Detection for Forward Colligion Warning (FCW): A plurality of times until a collision with a pedestrian on the front side of the vehicle is output.

Automatic Emergency Breaking (AEB): Lighting of the brake light of the preceding vehicle is detected.

Vehicle Detection for FCW/AEB

Lane Departure Warning (LDW): A lane is detected by edge detection. In addition to the lanes, a road shoulder and a curb can be detected. However, no warning is issued while an indicator is operating.

Traffic Jam Pilot (TJP): Realized by being integrated with a millimeter-wave radar. For example, the vehicle speed is controlled according to whether or not a preceding vehicle exists, the vehicle speed is controlled as recognizing a traffic sign regarding speed limits, the vehicle speed is controlled as recognizing a traffic sign at the entrance and the exit of a highway, and the vehicle speed is automatically reduced when the vehicle approaches a curve.

Lane Keeping Aid (LKA): Performed by the TJP.

Vision Only Adaptive Cruise Control (VOACC): Performed by the TJP.

Vision Only Traffic Sign Recognition (VOTSR): Performed by the TJP. The traffic signs at the entrance and the exit of the highway (for example, identify sign "highway") is recognized and determined. On the highway, the traffic sign regarding the speed limits is recognized, and the vehicle speed is automatically controlled.

Intelligent Head Ramp Control (IHC): The presence or absence of the headlight of the oncoming vehicle is detected, and the high beam and the low beam of the headlamp of the vehicle are switched. Furthermore, presence or absence of a tail lamp of the preceding vehicle is detected, and the high beam and the low beam of the headlamp of the vehicle are switched. Furthermore, it is determined in which of a left and right lanes a light source exists, and a high beam that avoids an oncoming vehicle and a preceding vehicle is emitted.

An example of the vehicle control system to which the technology according to the present disclosure may be applied has been described above. The technology according to the present disclosure can be applied when the in-vehicle camera 100 of the configuration of the vehicle control system described above is provided in the vehicle. Specifically, if the reflection of the reflected image generated on the vehicle inner side of the vehicle window 20 is prevented by using the technology according to the present disclosure when the in-vehicle camera 100 images the front side of the vehicle, it is possible to obtain a captured image that is more easily seen. Therefore, it is possible to reduce driver's fatigue. Furthermore, in a case where automatic driving or the like is performed by using the captured image, drive control can be more easily performed than a case where reflection of an object or the like in the vehicle is generated.

Note that the effects described herein are only exemplary and not limited to these. Furthermore, there may be an additional effect which is not described herein. Furthermore, the present technology should not be limited to the above-mentioned embodiments of the technology and interpreted. The embodiment of the technology discloses the present technology in forms of examples, and it is obvious that those skilled in the art can amend or find alterations of the embodiments without departing from the scope of the present technology. That is, claims should be considered in order to determine the scope of the present technology.

Furthermore, the imaging system according to the present technology can have the configurations below.

(1) An imaging system including:
a camera lens attaching portion that is provided on a vehicle window and has a lens attaching surface on a vehicle interior side; and
a camera, of which a lens is attached to the camera lens attaching portion, that images outside of a vehicle through the camera lens attaching portion, in which
the camera is attached so that an optical axis direction of the lens is orthogonal to the lens attaching surface.

(2) The imaging system according to (1), in which
a surface of the camera lens attaching portion opposed to the lens attaching surface is a window surface.

(3) The imaging system according to (2), in which
the window surface of the camera lens attaching portion is an inclined surface same as a window surface of the vehicle window.

(4) The imaging system according to (2), in which
a cross-sectional surface of the camera lens attaching portion has a polygonal shape, and a surface opposed to the lens attaching surface to which the lens is attached is the window surface.

(5) The imaging system according to (3) or (4), further including:
a wiper using the window surface of the vehicle window and the window surface of the camera lens attaching portion as wiping surfaces.

(6) The imaging system according to (2), in which
the window surface of the camera lens attaching portion is an inclined surface different from a window surface of the vehicle window.

(7) The imaging system according to (6), in which
a cross-sectional surface of the camera lens attaching portion has a shape of an alphabet L, a corner portion of the shape of the alphabet L is provided to be projected in a mountain-like shape toward outside of the vehicle from the vehicle window, one projecting surface of the camera lens attaching portion 30 is used as a window surface, and a surface opposed to the window surface is the lens attaching surface for the lens.

(8) The imaging system according to (6) or (7), further including:
a wiper using the window surface of the camera lens attaching portion as a wiping surface.

(9) The imaging system according to any one of (2) to (8), in which an angle of view of the camera is set within the window surface of the camera lens attaching portion.

(10) The imaging system according to any one of (2) to (9), in which
a light shielding portion is provided on a surface other than the lens attaching surface and the window surface.

(11) The imaging system according to any one of (1) to (10), in which
the lens has contact with the lens attaching surface.

(12) The imaging system according to any one of (1) to (11), in which
by forming an opening in the vehicle window and fitting the camera lens attaching portion into the opening, the camera lens attaching portion is provided on the vehicle window.

(13) The imaging system according to any one of (1) to (12), in which
the camera lens attaching portion is provided for each camera.

(14) The imaging system according to any one of (1) to (12), in which
a plurality of the cameras is provided on the camera lens attaching portion.

INDUSTRIAL APPLICABILITY

In the imaging system and the vehicle window according to the present technology, the camera lens attaching portion having the lens attaching surface on the vehicle interior side is provided on the vehicle window. The camera is attached to the camera lens attaching portion so that the optical axis direction of the lens is orthogonal to the lens attaching surface, and the camera images outside of the vehicle through the camera lens attaching portion. Therefore, it is possible to prevent the reflection of the reflected image generated on the vehicle inner side of the vehicle window. Therefore, the present technology is suitable for a device that uses a captured image obtained by imaging outside from the inner side of the vehicle window.

REFERENCE SIGNS LIST

10 Imaging system
20 Vehicle window
21 Opening
22 Window surface
30 Camera lens attaching portion
31a Lens attaching surface
31b Window surface
31c Joint surface
31d Upper surface
32 Light shielding portion
40 Camera
50 Fixing mechanism portion
60 Rearview mirror
70 Roof portion
80 Wiper for camera lens attaching portion
81 Wiper motor
82 Wiper blade
83 Wiper arm

The invention claimed is:

1. An imaging system comprising:
a camera lens attaching portion that is provided on a vehicle window and has a lens attaching surface on a vehicle interior side; and
a camera, of which a lens is attached to the lens attaching surface of the camera lens attaching portion, that images outside of a vehicle through the camera lens attaching portion, wherein
the camera is attached so that an optical axis direction of the lens is orthogonal to the lens attaching surface, wherein the camera lens attaching portion is configured to be disposed in an opening in the vehicle window such that the camera captures the images of outside of the vehicle without image light of the images passing through the vehicle window, wherein the camera lens attaching portion has an L-shaped cross-section, wherein a corner portion of the L-shaped cross-section projects from the vehicle window in a forward direction of the vehicle and wherein a window surface of the camera lens attaching surface is inclined with respect to the vehicle window.

2. The imaging system according to claim 1, further comprising:
a wiper using the window surface of the camera lens attaching portion as a wiping surface.

3. The imaging system according to claim 1, wherein
an angle of view of the camera is set within the window surface of the camera lens attaching portion.

4. The imaging system according to claim 1, wherein
a light shielding portion is provided on a surface other than the lens attaching surface and the window surface.

5. The imaging system according to claim 1, wherein
the lens has contact with the lens attaching surface.

6. The imaging system according to claim 1, wherein
by forming an opening in the vehicle window and fitting the camera lens attaching portion into the opening, the camera lens attaching portion is provided on the vehicle window.

7. The imaging system according to claim 1, wherein
the camera comprises a plurality of cameras and wherein the camera lens attaching portion is provided for each camera.

8. The imaging system according to claim 1, wherein
the camera comprises a plurality of cameras and wherein the plurality of cameras are provided on the camera lens attaching portion.

* * * * *